United States Patent Office 2,991,972
Patented July 11, 1961

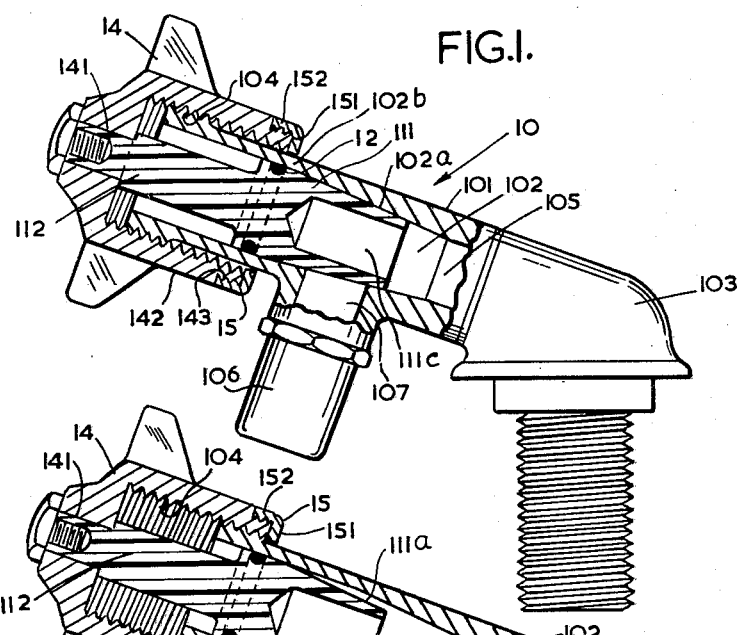

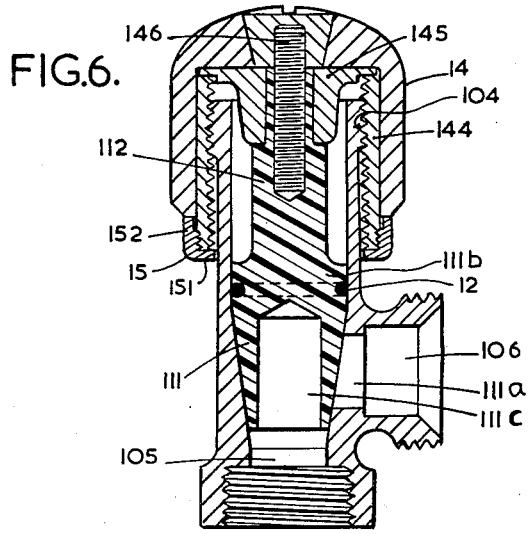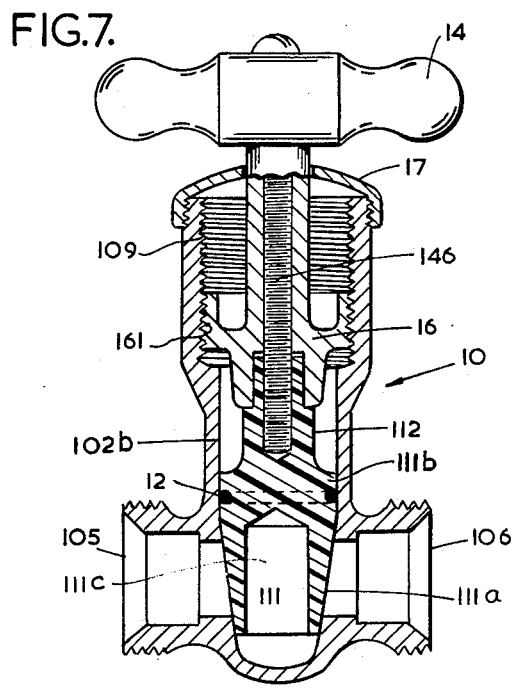

2,991,972
COCKS, TAPS, VALVES AND THE LIKE
Leslie Roy Busby, Erdington, Birmingham, England, assignor to Charles Elliott Tapscott Cridland and Edward Albert Corbett, both of Cotteridge, England
Filed Jan. 2, 1958, Ser. No. 706,771
Claims priority, application Great Britain Aug. 29, 1957
1 Claim. (Cl. 251—175)

This invention has reference to improvements relating to cocks, taps, valves and the like and is concerned particularly with cocks, taps, valves and the like of the type incorporating a tapered closure member which is required to cooperate with a tapered seating in the body of the cock, tap, valves or the like.

It has not been considered possible heretofore to produce by ordinary machining a cock, tap, valve or the like of the type aforesaid which will be fluid tight when subjected to the relatively high pressures experienced in domestic water supply systems and which will admit of easy opening and closing operations as required, although with a view to overcoming this difficulty it has been suggested heretofore in a valve of the said type to engage a tapered or conical closure member with a similar tapered opening in a separately formed hollow seat member mounted in the valve body and to provide the said tapered or conical closure member with a hollow interior which is always open to the inlet pressure and to make both the closure member and the seat member thin enough so that they are mutually flexible when brought together and will readily flex to meet each other thereby eliminating the necessity for accurately grinding and fitting these parts together.

A valve according to the said prior proposal however has involved the provision of a flowable mass of sealing material between the seat member and the walls of the cavity within which the seat member is floatingly supported, the said sealing material being introduced through a check valve.

The present invention has for its object to provide an improved cock, tap, valve and the like of the tapered closure member type which is simple in construction, efficient in operation, fluid tight and capable of being produced at a comparatively low cost.

Accordingly the invention consists of a cock, tap, valve or the like of the type hereinbefore referred to which is characterized in that the fluid flow control member is made of a resilient and deformable plastic material and incorporates a frusto-conical sealing surface and a cylindrical guiding surface and in that the body is provided with a complementary frusto-conical seating surface for engagement with the frusto-conical sealing surface of the fluid flow control member aforesaid and with a complementary seating surface for engagement in a guided relationship with the cylindrical guiding surface aforesaid and in that the said fluid flow control member is provided with a flexibly walled hollow interior which is always subject to or which is liable always to be subject to the inlet pressure.

The invention also resides in cocks, taps, valves and the like constructed, and adapted for use substantially in the manner to be described hereinafter.

Examples of the manner of carrying the invention into effect will now be described with particular reference to the accompanying drawings wherein:

FIGURE 1 is a view partly in section and partly in elevation illustrating the invention as applied to a bib cock for use with domestic water supply systems and showing the fluid flow control member in the fully closed position, FIGURE 2 is a view similar to FIGURE 1 but showing the fluid flow control member in the fully open position, FIGURE 3 is a perspective view seen from above of the fluid flow control member employed in the bib cock illustrated in FIGURES 1 and 2, FIGURE 4 is a perspective view from below of the fluid flow control member illustrated in FIGURE 3, FIGURE 5 is a view partly in front elevation and partly in section of an alternative construction of the fluid flow control member, FIGURE 6 is a view in section illustrating the invention as applied to an "angle" tap, and FIGURE 7 is a view partly in section and partly in elevation illustrating the invention as applied to a "stop" tap.

In the drawings, where appropriate, like numerals of reference are employed to denote similar or analogous parts in the several views.

Referring first to the embodiment of the invention illustrated in FIGURES 1 and 2.

According to the said embodiment of the invention the body of the bib cock, denoted generically by the reference numeral 10 incorporates an inwardly projecting portion 101 having a bore denoted generically by the reference numeral 102 and a fixing section 103, said inwardly projecting portion 101 being screw-threaded externally at the outer end as denoted by the reference numeral 104.

The bore 102 has communication with the inlet passage 105 in the fixing section 103 and with the inclined outlet spout 106 by way of a port 107 in the wall of the body 10.

The bore 102 is provided with a frusto-conical section 102a the narrow end of which connects with the inlet passage 105 and with a cylindrical guiding section 102b.

Displaceably mounted within the bore 102 is a fluid flow control member denoted generically by the reference numeral 11 incorporating a sleeve 111 and an outwardly projecting stem 112.

The sleeve 111 is provided with a tapered portion 111a and a cylindrical portion 111b.

The fluid flow control member 11 is made from a resilient and deformable but relatively rigid synthetic material conveniently the material known as "nylon" and may be moulded in one piece as depicted in FIGURES 1–4 or of a composite construction as illustrated in FIGURE 5 in which case the sleeve 111 is formed of nylon and the stem 112 of metal.

The walls bounding the hollow interior 111c of the sleeve 111 are of a thickness which admits of a flexing of the walls under internal pressure.

The hollow interior 111c of the sleeve 111 is open at all times to the inlet pressure.

The cylindrical portion 111b of the sleeve 111 is provided adjacent to the top with an annular groove within which is located an O section packing ring 12 of known type.

At the top the stem 112 is stepped as at 113 to provide a spigot of elongated formation which is adapted to be engaged with an elongated slot 141 of a complementary shape formed in the centre of a capstan head 14, said capstan head 14 being provided with a sleeve 142 which is threaded externally for engagement with the screw-threaded section 104 of the body 10.

Loosely mounted on the body 10 of the tap and on the inner side of the screw-threaded portion 104 is a ring 15, hereinafter termed the locking ring 15, of an L shape in cross section. The internal diameter of the inwardly turned flange 151 of this locking ring 15 is sufficient just to enable the locking ring 15 to be threaded over the screw-threaded portion 104 of the body.

The outer limb 152 of the locking ring 15 is screw-threaded internally and is adapted to be engaged with a corresponding screw-threaded portion 143 formed externally on the presented end of the sleeve 142.

When the capstan head 14 is being unscrewed after the locking ring 15 has been screwed on to the sleeve section 142, the unscrewing action occasions a very slight canting of the locking ring 15 relatively to the body 10 which is sufficient to prevent the locking ring 15 being drawn over the screw-threaded portion 104 thereby limiting the degree of unscrewing permitted to the capstan head 14. At the same time should it be required to detach the capstan head 14 and any parts associated therewith this can readily be effected by unscrewing the locking ring 15 until this becomes detached from the sleeve section 142 and then unscrewing the capstan head from the body.

If desired the locking ring 15 may have seated therein a split ring not shown, which when seated in the locking ring 15 rests on the inner surface of the inwardly turned flange 151 therein and assumes a diameter less than the maximum diameter of the screw-threaded portion 104 so that when the capstan head is fully unscrewed the split ring prevents the locking ring being drawn over the screw-threaded portion 104.

It will be appreciated that rotation of the capstan head 14 occasions a simultaneous rotation and axial displacement of the sleeve 111 whereby the tapered portion 111a is caused to uncover or cover the outlet port 107 dependent upon the initial position of the said tapered portion 111a and the direction of rotation imparted to the capstan head 14.

When the tapered portion 111a is moved to the fully closed position the frusto-conical surface thereof seats on the frusto-conical seating surface 102a of the bore 102 to provide a positive cut-off.

It will be appreciated also that since the hollow interior 111c of the sleeve 111 is open to the pressure on the inlet side and since the walls of the sleeve 111 are flexible the sleeve 111 is deformed into sealing contact with the surface of the frusto-conical section 102a of the bore so that the bib cock is fluid tight when in the fully closed position whilst the possibility of seepage past the cylindrical portion 111b of the sleeve 111 is prevented at all times by the O ring 12.

Moreover it will be appreciated that the low frictional resistance of the nylon and metal contacting surfaces admits of an easy opening and closing movement of the fluid flow control member and that such movements are facilitated by the guiding action afforded by the movement of the cylindrical portion 111b of the sleeve 111 within the cylindrical portion 102a of the bore 10.

The embodiment of the invention illustrated in FIGURE 6 illustrates the invention as applied to a tap in which the outlet 106 is at right angles to the inlet 105, the fluid flow control member 11 is generally similar in construction and identical in operation with that of the fluid flow control member 11 described with reference to FIGURES 1–5.

In this embodiment of the invention the operating head 14 is made of a synthetic plastic material and has moulded therein an internally screw-threaded sleeve 144 which cooperates with an externally screw-threaded portion 104 at the upper end of the body 10. This operating head 14 also incorporates a cap 145 which fits on the stepped portion 113 of the stem 112 of the fluid flow control member 11, the operating head 14 being secured to the stem 112 by means of a bolt 146.

Inadvertent unscrewing of the operating head 14 is prevented by means of a locking ring 15 substantially as disclosed in the embodiment first described.

In the embodiment of the invention disclosed in FIGURE 7 the invention is shown as applied to a stop valve having oppositely disposed inlet and outlet passages 105, 106 respectively. In this embodiment of the invention the fluid flow control member 11 again is substantially similar in construction to that disclosed in the embodiments first described.

The fluid flow control member 11 is secured by means of a screw 146 to an operating head 14 and to a sleeve 16 having an externally screw-threaded portion 161 which cooperates with the internally screw-threaded portion 109 at the upper end of the body 10.

Inadvertent unscrewing of the operating head 14 is prevented by a cap 17 which screws on to the upper end of the body 10.

In this last described embodiment of the invention the tapered portion 111a of the sleeve 11 is subject on the inlet side to fluid pressure always and in conjunction with the fluid filling the hollow interior 111c of the sleeve 111 forces the frusto-conical sealing surface of the tapered portion 111a of the said sleeve 111 into fluid tight sealing contact with the surface of the frusto-conical section 102 and of the bore 10 so that there is always a fluid tight sealing when the fluid flow control element is in the fully closed position.

Any tendency to leakage on the inlet side when the fluid flow control member 11 is in the closed position results in an increase in the internal pressure in the hollow interior 111c of the sleeve 111 so that a fluid tight sealing is ensured.

It is to be understood that the embodiments of the invention herein described and illustrated are by way of example only and that the invention may be applied equally to other forms of taps, cocks and valves for example radiator valves.

Further it is to be understood that synthetic plastic materials other than nylon may be used.

I claim:

A fluid flow control means comprising a body, a bore within said body incorporating a cylindrical guiding section which continues as a fixed frusto-conical seating section, the smaller end of which is presented in the direction of flow into said bore, a fluid flow control member which is made of a resilient and deformable plastic material and which has a cylindrical section which operates in the complementary cylindrical guiding section of the bore aforesaid to ensure a supported and guided axial movement of the closure member under all conditions of usage and which has a hollow unported thin walled frusto-conical skirt, constituting the acting end of said closure member, the interior of which in use is susceptible at all times to liquid pressure and which co-operates with said frusto-conical seating section, said body having an inlet to said bore and an outlet from said bore in the length of the frusto-conical seating section, a stem projecting outwardly from the cylindrical section of said flow control member and rigid therewith, positively actuable manually operable means secured to said stem for occasioning simultaneously an axial displacement of and rotation of the closure member aforesaid both for opening and closing purposes, and means for preventing seepage of fluid past said guiding section into the space surrounding the stem whereby a triple closure action is provided to ensure leak-proof operation, namely closure of the outlet by a covering action as the frusto-conical skirt is positively moved on to its seating in opposition to the flow to cover the outlet, a positive forcing of the resilient wall of the frusto-conical skirt into sealing contact with the frusto-conical seating by the manipulation of the actuating means so that during the latter stages of a closing operation the frusto-conical skirt is forced onto the frusto-conical seating and is by reason of the combined rotational and axial displacement caused to exert a progressive grinding action which of necessity involves an accurate bedding of the frusto-conical skirt on its seating and by reason of the nature of the material from which the skirt is made and imbedment of any grit on the seating in the surface of the skirt, and the tendency to expand the resilient wall of the frusto-conical skirt into contact with the seating surface due to liquid pressure exerted in the interior of the hollow frusto-conical skirt.

(References on following page)

References Cited in the file of this patent

UNITED STATES PATENTS

| | | |
|---|---|---|
| 1,087,001 | Dujat | Feb. 10, 1914 |
| 1,264,718 | Wagner | Apr. 30, 1918 |
| 1,423,966 | Palmaffy | July 25, 1922 |
| 1,596,049 | Kienast | Aug. 17, 1926 |
| 1,909,303 | Mueller | May 16, 1933 |
| 2,081,132 | Barnes | May 25, 1937 |
| 2,374,195 | Guarnaschelli | Apr. 24, 1945 |
| 2,513,976 | Weatherhead | July 4, 1950 |
| 2,832,562 | Myers | Apr. 29, 1958 |

FOREIGN PATENTS

| | | |
|---|---|---|
| 1,035,035 | France | Apr. 15, 1953 |
| 1,016,084 | Germany | Sept. 19, 1957 |